United States Patent
Smith et al.

(10) Patent No.: US 12,076,927 B2
(45) Date of Patent: Sep. 3, 2024

(54) DEVICE AND METHOD FOR CUTTING A CONTINUOUS FIBER 3D PRINTING FILAMENT

(71) Applicants: Matthew Smith, Atlanta, GA (US); Andrew Myers, Suwanee, GA (US); Thomas Bougher, Coppell, TX (US); Jacob Lloyd, Atlanta, GA (US)

(72) Inventors: Matthew Smith, Atlanta, GA (US); Andrew Myers, Suwanee, GA (US); Thomas Bougher, Coppell, TX (US); Jacob Lloyd, Atlanta, GA (US)

(73) Assignee: TCPoly, Inc., Atlanta, GA (US)

( * ) Notice: Subject to any disclaimer, the term of this patent is extended or adjusted under 35 U.S.C. 154(b) by 191 days.

(21) Appl. No.: 17/559,890

(22) Filed: Dec. 22, 2021

(65) Prior Publication Data
US 2022/0194006 A1  Jun. 23, 2022

Related U.S. Application Data

(60) Provisional application No. 63/130,082, filed on Dec. 23, 2020.

(51) Int. Cl.
*B29C 64/321* (2017.01)
*B29C 64/118* (2017.01)
*B29C 64/209* (2017.01)
*B29C 64/295* (2017.01)
*B29C 64/314* (2017.01)
*B33Y 30/00* (2015.01)
*B33Y 40/10* (2020.01)

(52) U.S. Cl.
CPC .......... *B29C 64/321* (2017.08); *B29C 64/118* (2017.08); *B29C 64/209* (2017.08); *B29C 64/295* (2017.08); *B29C 64/314* (2017.08); *B33Y 30/00* (2014.12); *B33Y 40/10* (2020.01); *B29C 2793/0027* (2013.01)

(58) Field of Classification Search
CPC ... B29C 64/321; B29C 64/118; B29C 64/209; B29C 64/295; B29C 64/20; B29C 2793/0027; B33Y 30/00
See application file for complete search history.

(56) References Cited

U.S. PATENT DOCUMENTS

2021/0170670 A1\* 6/2021 Barr ..................... B29C 64/194

FOREIGN PATENT DOCUMENTS

CN  109177166 A  \* 1/2019  .......... B29C 64/205

\* cited by examiner

*Primary Examiner* — Nahida Sultana
*Assistant Examiner* — Mohamed K Ahmed Ali
(74) *Attorney, Agent, or Firm* — Lempia Summerfield Katz LLC

(57) ABSTRACT

A device for cutting a filament of a 3D printer includes a blade having a first end and a second end opposite the first end. The device also includes a support that is attachable to a heater block of the 3D printer and supports the blade, such that the blade is movable relative to the heater block. The first end of the blade is a cutting end, and the second end of the blade is a drive end. The drive end of the blade has a surface configured to receive a force from outside of the device, such that the blade moves relative to the heater block.

10 Claims, 10 Drawing Sheets

DEVICE AND METHOD FOR CUTTING A CONTINUOUS FIBER 3D PRINTING FILAMENT

PRIORITY

This application claims the benefit of U.S. Provisional Patent Application No. 63/130,082, filed on Dec. 23, 2020, which is hereby incorporated by reference in its entirety.

BACKGROUND 3D printing with continuous fibers and wires is a rapidly expanding manufacturing technology due to the high strength achievable through continuous reinforcement with materials such as carbon fiber, glass, aramids, or metals. There are a number of different methods to additively manufacture a continuous fiber reinforced part, some of which utilize high degree of freedom robotic arms, while others rely on the more traditional three degrees of freedom cartesian motion popularized in fused filament fabrication (FFF) 3D printing. With FFF style printing, a part is built up layer by layer, and often, one or more toolheads that deposit polymer and continuous fiber stop printing and move to new locations to resume printing. The continuous fiber material is cut to allow the toolhead to move to the new location.

SUMMARY

In one example, a device for cutting a filament of a 3D printer includes a blade having a first end and a second end opposite the first end. The device also includes a support that is attachable to a heater block of the 3D printer and supports the blade, such that the blade is movable relative to the heater block. The first end of the blade is a cutting end, and the second end of the blade is a drive end. The drive end of the blade has a surface configured to receive a force from outside of the device, such that the blade moves relative to the heater block.

In one example, the blade is a spring-loaded blade.

In one example, the support includes one or more pins or screws, with which the device is attachable to the heater block of the 3D printer. The support also includes a plate through which the blade and the one or more pins or screws extend, and a spring that abuts the plate, such that the spring is positioned between the heater block of the 3D printer and the plate when the device is attached to the heater block of the 3D printer.

In one example, the spring is a compression spring, and the plate is a spring plate.

In one example, the support further includes a stop plate, through which the blade extends. The stop plate is attached to and positionally fixed relative to the one or more pins or screws. The blade includes a stop that is disposed between the spring plate and the stop plate. The stop of the blade abuts the stop plate when the device is attached to the heater block of the 3D printer and is in a rest position.

In one example, the blade is a first blade. The device further includes a second blade attached to the first blade, such that when the first blade moves in a first direction in response to the force received at the surface, the second blade moves in a second direction, the second direction being opposite the first direction.

In one example, the second blade is attached to the first blade via one or more linkages.

In one example, the first blade includes a first through hole, and the second blade includes a second through hole. The first through hole and the second through hole are sized, such that the filament is extendable through the first through hole and the second through hole. A first edge of the first blade defines the first through hole, and a second edge of the second blade defines the second through hole, the first edge and the second edge being configured to cut the filament.

In one example, a 3D printer includes an extruder head including a heater block and a cutting mechanism attached to the heater block and configured to cut a filament that is extendable through the heater block. The cutting mechanism includes a blade that is movable relative to the heater block. The blade has a cutting end and a drive end opposite the cutting end. The drive end of the blade has a surface configured to receive a force from outside of the extruder head, such that the blade moves relative to the heater block. The 3D printer also includes a toolhead that is movable relative to the extruder head in a first direction and a second direction. The second direction is opposite the first direction. The toolhead is configured to move in the first direction and into contact with the extruder, such that the force applicator applies a force to the surface of the drive end of the blade and the blade moves relative to the first heater block and cuts the filament.

In one example, the extruder head is a first extruder head, and the heater block is a first heater block. The toolhead includes a second extruder head. The second extruder head includes a second heater block and a force applicator attached to the second heater block.

In one example, the force applicator is positionally fixed relative to the second heater block.

In one example, the blade is a spring-loaded blade.

In one example, the cutting mechanism further includes a support that is attached to the first heater block. The support supports the blade, such that the blade is translatable relative to the support and the first heater block.

In one example, the blade is configured to translate between a first position relative to the first heater block and a second position relative to the first heater block. The first position is a rest position in which no force from outside of the device is applied to the surface of the drive end of the blade. The second position is a cutting position in which the blade is configured to cut the filament.

In one example, the second extruder is configured to move in the second direction, away from the first extruder and out of contact with the first extruder, and the spring-loaded blade is configured to return to the rest position when the first extruder is out of contact with the first extruder.

In one example, a portion of the blade is disposed within the first heater block when the blade is in the rest position.

In one example, the cutting mechanism is a first cutting mechanism, the filament is a first filament, the blade is a first blade, and the surface is a first surface. The second extruder further includes a second cutting mechanism configured to cut a second filament that is extendable through the second heater block. The second cutting mechanism includes a second blade that is movable relative to the second heater block. The second blade has a cutting end and a drive end opposite the cutting end of the second blade, the drive end of the second blade having a second surface configured to receive a force from outside of the second extruder, such that the second blade moves relative to the second heater block. The force applicator includes the second surface of the drive end of the second blade.

In one example, the 3D printer further includes a proximity probe configured to determine a distance between the first heater block and the second heater block.

In one example, the proximity probe includes a proximity sensor attached to one of the first heater block and the second heater block, and a metal target attached to the other of the first heater block and the second heater block.

In one example, wherein the 3D printer further includes a first rail that supports the first extruder head, a first motor configured to translate the first extruder head along the first rail, a second rail that supports the second extruder head, and a second motor configured to translate the second extruder along the second rail.

In one example, the 3D printer further includes a processor configured to control the second motor, such that the second extruder head moves towards the first extruder head, and receive data representing the distance between the first heater block and the second heater block from the proximity sensor. The processor is further configured to identify the distance between the first heater block and the second heater block based on the received data, and compare the identified distance between the first heater block and the second heater block to a predetermined distance. The processor is configured to, based on the comparison, stop the first motor when the identified distance between the first heater block and the second heater block equals or is less than the predetermined distance.

In one example, the predetermined distance represents a distance between the first heater block and the second heater block at which the blade cuts the filament.

In one example, the processor is further configured to, after the first motor is stopped, control the second motor, such that the second extruder head moves away from the first extruder head.

In one example, a method for cutting a filament of a 3D printer includes translating, by a first motor, a toolhead of the 3D printer towards an extruder head of the 3D printer until a portion of the toolhead is in contact with a cutting mechanism of the extruder head and the toolhead is a predetermined distance away from the extruder head. The translating includes actuating the cutting mechanism, such that the cutting mechanism cuts a filament extending through the extruder head.

In one example, actuating the cutting mechanism includes driving, by the portion of the toolhead, a force receiving surface of a blade of the cutting mechanism, such that the blade moves relative to a heater block of the extruder head and cuts the filament.

In one example, translating the toolhead towards the extruder head until the toolhead is the predetermined distance away from the extruder head includes identifying data representing a distance between the toolhead and the extruder head, and identifying the distance between the toolhead and the extruder head based on the identified data. The translating also includes comparing the identified distance between the toolhead and the extruder head to a predetermined distance, and based on the comparing, stopping the translating when the identified distance between the toolhead and the extruder head equals or is less than the predetermined distance.

In one example, identifying the data includes receiving the data from a proximity probe attached to the toolhead, the extruder head, or the toolhead and the extruder head.

DETAILED DESCRIPTION

Figures 1A, 1B:
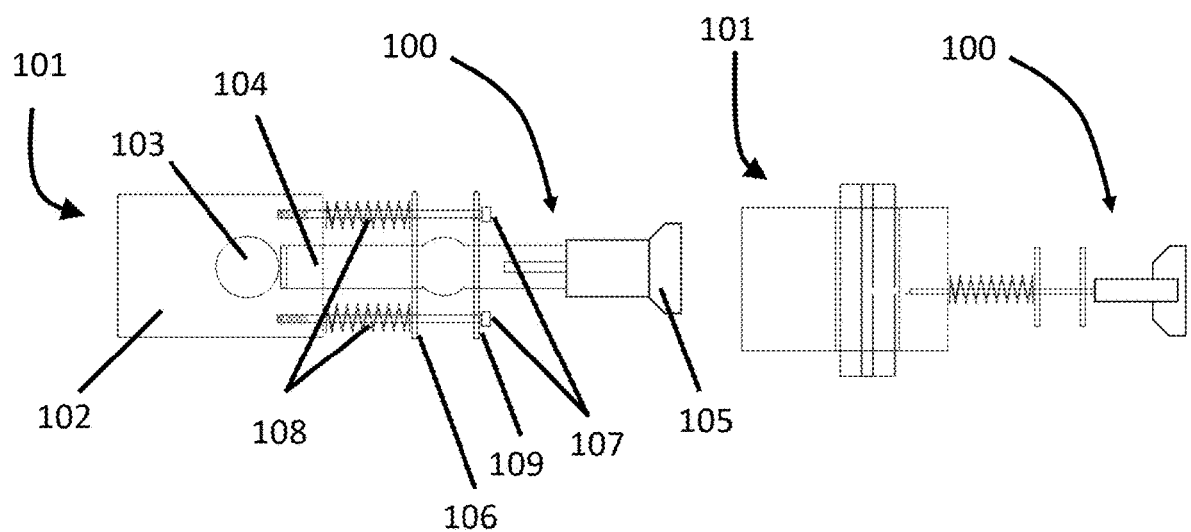
FIG. 1a shows a top view of one embodiment of a force actuated cutting mechanism.
FIG. 1b shows a side view of the force actuated cutting mechanism of FIG. 1.

Cutting mechanisms of the prior art for cutting a solid fiber that is extruded during 3D printing include an electromechanical scissor cutting action that cuts a wire where the wire exits a tip of a printing nozzle. This solution provides a well-controlled cutting action, but also requires significant hardware and electronics to achieve and is exclusively used on purpose-built printing systems.

The present embodiments provide cutting mechanisms that may be used to modify existing 3D printers (e.g., with dual independent tool heads) to cut continuous fiber materials. For example, a cutting mechanism of the present embodiments includes all mechanical hardware and does not require any additional wiring or electrical connections. The cutting mechanism is attached to a heater block and includes a cutting blade, mounting screws, stabilizer plates, and one or more springs (e.g., springs). The cutting blade is housed within a narrow opening on a side of the heater block and is held in place with screws. The opening on the side of the heater block is narrow to prevent leakage of molten polymer. The opening is on a single side of the heater block and does not extend all of the way through the heater block. In other words, the opening extends into the heater block, less than a length of the heater block.

In one embodiment, the cutting blade is housed within the heater block (e.g., within the melt zone), such that the cutting occurs above a threaded end of a nozzle of the one toolhead. The cutting mechanism may be configured, such that the blade moves a predetermined distance relative to the heater block to cut partially through a PTFE tube for support around a cut zone. In one embodiment, the cutting mechanism is configured such that a length of travel of the blade is greater than a diameter of the PTFE tube within the melt zone. The blade may be housed within the melt zone of the heater block, such that a force required to cut the filament is reduced compared to other positioning for the blade.

Springs on the screws press against a stabilizer plate to keep the blade out of a filament path in a resting position of the blade. In other words, the blade is spring loaded, such that when a cutting force is removed, the blade moves out of the filament path. A plunger that has, for example, a flat (e.g., perpendicular) surface to apply a force and move the blade is attached to the end of the blade.

While or after one of the toolheads is printing, the cutting mechanism is initiated by movement of the other of the toolheads in relation to (e.g., towards) the one toolhead. The other toolhead moves into a cutting position (e.g., from a home position) while the one toolhead is printing. The other toolhead may be any number of different types of toolheads including, for example, an extruder or a mechanism with no other function other than cutting (e.g., a movable mass). In one embodiment, the other toolhead is also an extruder with a cutting mechanism. For example, the other toolhead may mirror the one toolhead, such that the flat surfaces of the cutting mechanisms face each other.

In one embodiment, the cut process is configured (e.g., by the processor) to set a length of the filament left after the cut to be equal to a length of a line to print on a part. In other words, a printed line is finished before retraction with no excess material. In another embodiment, the cut process may be configured (e.g., by the processor) to be a coast process in which the filament is dragged into position on print. In yet another embodiment, the cut process may be configured (e.g., by the processor) to be a compression where the filament below the cut is pushed with the filament above the cut.

The force is applied to the flat surface of the one toolhead by the other toolhead moving against the one toolhead, thereby moving the blade across the filament path and cutting the solid fiber or wire. The cutting occurs within a heated portion of the extruder so that the polymer is molten and only the solid fiber/wire is to be cut. The other toolhead then moves away from the one toolhead, and the springs return the blade to the resting position clear of the filament path. The entire process for cutting is controlled by movement of toolheads with commands that may be initiated within standard 3D printer machine code (e.g., g code), common to nearly all open material FFF 3D printers. In one embodiment, the cutting procedure may be tied into retraction script (e.g., initiated on standard 3D printing slicing software). This design allows for a continuous fiber filament cutting mechanism to be used with nearly any FFF 3D printer with dual independent extruder heads.

At least one of the toolheads may return to a respective home position after the cut is made. In one embodiment, both of the toolheads return to home positions, respectively. In one embodiment, the one toolhead is moved away from the printed part while simultaneously extruding the filament (e.g., to prevent pull out). The one toolhead may then move down at an angle to place the filament back on the printed part.

The two toolheads of the 3D printer may be linked by a rail sharing two cartesian axes (e.g., Y-axis and Z-axis) and may be independently movable (e.g., translatable) in a third cartesian axis (e.g., X-axis). This independent movement in the third cartesian axis allows the two toolheads to come into close proximity, such that the cutting mechanism is actuated. Each of the two toolheads may move along the third cartesian axis at any number of speeds (e.g., 5-25 mm/s). In one embodiment, the 3D printer is in a full control mode, such that each of the two toolheads has at least one independent axis. This allows the two toolheads to move simultaneously. In another embodiment, the two toolheads are not connected on a rail constraining any axis of movement.

The toolheads are configured for collision detection to prevent movement of the other toolhead to a position that is too close to the one toolhead. For example, the two toolheads include a proximity probe. The proximity probe may include a mechanical switch attached to one of the toolheads, a proximity sensor and a metal target attached to the toolheads, respectively, or another types of proximity probe. Once, for example, the mechanical switch is actuated or a processor of the 3D printer determines, based on data received from the proximity sensor, that the toolheads are a predetermined distance from each other, relative movement between the two toolheads is stopped.

Turning now to the drawings, FIG. 1a shows a top view of one embodiment of a cutting mechanism 100 attached to a hot end of a 3D printing filament extrusion system 101, and FIG. 1b shows a side view of the cutting mechanism 100 attached to the 3D printing filament extrusion system 101. A metal block 102 (e.g., a heater block) is heated to melt a filament passing through a hole 103. A polymer contained within a volume of a cylinder defined by the hole 103 is molten during 3D printing, but a solid wire core remains and extends through the middle of the cylinder in an axial direction. A blade 104 is positioned such that the blade 104 (e.g., a cutting end of the blade 104) may cut through the solid wire. A solid strike surface 105 is mounted to an end of the blade 104 (e.g., a surface of a drive end of the blade 104), where a force (e.g., a force from outside of the toolhead to which the blade 104 is attached) may be applied from motion of an independent toolhead.

A force applied to the solid strike surface 105 will move the blade 104 and a spring plate 106 that is guided and attached with mounting screws 107. The mounting screws 107 may, for example, be threaded into the heater block 102. The blade 104 passes across the filament path, cutting the solid wire. Compression springs 108 (e.g., mounting springs) on the mounting screws 107 push the blade 104 back to a resting position once the force has been removed from the solid strike surface 105. The spring plate 106 creates a counteracting force for the compression springs 108 against the heater block 102. The spring plate 106, the mounting screws 107, and the compression springs 108 at least partially form a support via which the blade 104 is movably attached to the heater block 102. The blade 104 may be easily removed and replaced by removing the mounting springs 108. In one embodiment, external heating is applied to the blade 104, such that buildup of solidified polymer is prevented.

The blade 104 may be any number of sizes and shapes, and may be made of any number of materials. For example, a thickness of the blade 104 may be between 0.4 mm and 0.8 mm (e.g., 0.5 mm). Other thicknesses of the blade 104 may be provided. For example, the thickness of the blade 104 may be less than 0.4 mm (e.g., 0.35 mm) or greater than 0.8 mm (e.g., 1.0 mm). As another example, the blade 104 may have a thickness that is at least 20% wider than a solid core of the filament that is to be cut. As yet another example, the blade 104 may be narrower than a molten thermoplastic portion of the filament to be cut.

Figure 2:
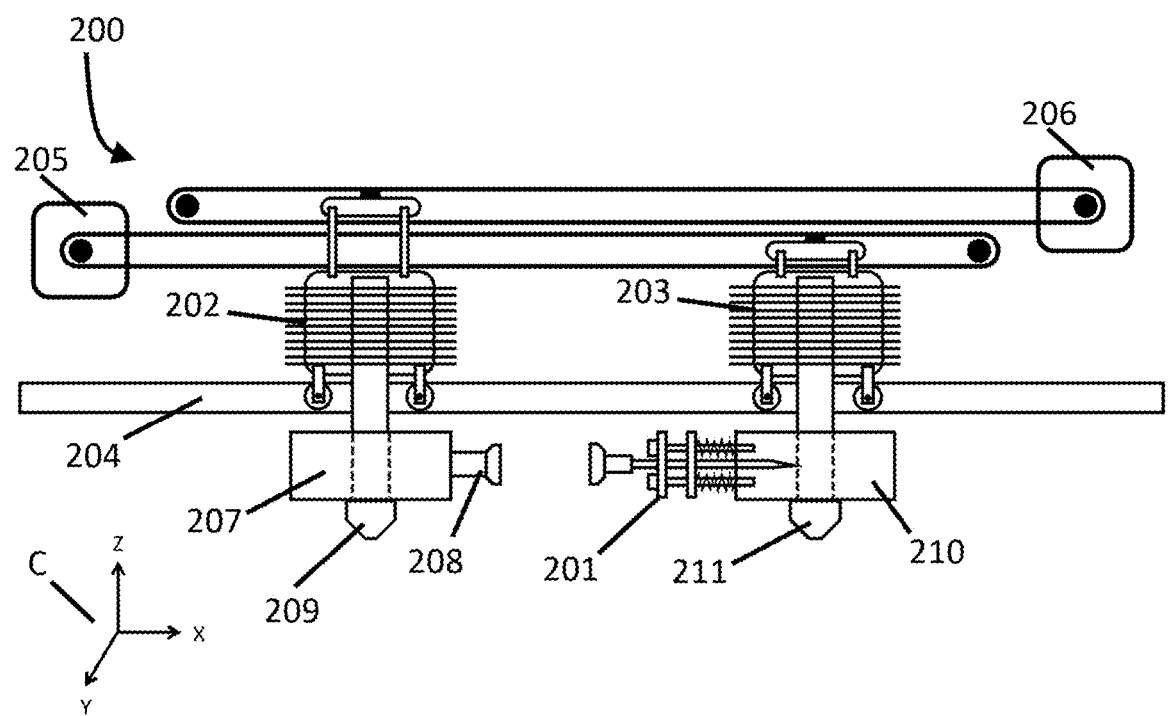
FIG. 2 shows one embodiment of a dual extrusion 3D printer system with a cutting mechanism.

FIG. 2 shows one embodiment of a dual independent extruder FFF 3D printing system 200 (e.g., FFF 3D printing system) that includes a filament cutting mechanism 201. The FFF 3D printing system 200 has three degrees of freedom that coincide with, for example, cartesian coordinate system C with X, Y, and Z directions. A print surface is located in, for example, the XY plane. The FFF 3D printing system 200 includes two filament extruder heads 202 and 203. The two filament extruder heads 202 and 203 are attached to a same linear rail 204 that keeps a same Y and Z position but allows independent movement in the X direction. The X direction movement for the two filament extruder heads 202 (e.g., left toolhead in FIG. 2) and 203 (e.g., right toolhead in FIG. 2) is controlled by independent stepper motors 205 and 206, respectively. The left toolhead 202 includes a standard FFF heater block 207 that has an attachment 208 (e.g., a rigid mass or body) to apply force against the second extruder 203. The left toolhead prints standard FFF filament through a standard FFF nozzle 209. The right toolhead 203 has a modified system for printing solid core filament including a specialized heater block 210 and printing nozzle 211. The filament cutting mechanism 201 is mounted to the heater block 210 and has a contact surface configured to interface with a contact surface of the attachment 208 of the left toolhead 202. When the right toolhead 203 has finished printing a segment and stopped movement, the left toolhead 202 may travel along the linear rail 204 (e.g., by the stepper motor 205 controlled by a processor) in the positive X direction, such that the contact surface of the attachment 208 pushes against the cutting mechanism 201 (e.g., a solid strike surface of the cutting mechanism 201). After the cut is complete, the left toolhead 202 moves in a negative X direction away from the right toolhead 203. The solid wire filament has been cut in the heater block 210, and the right toolhead 203 is free to move without dragging the solid wire filament.

Figure 3:
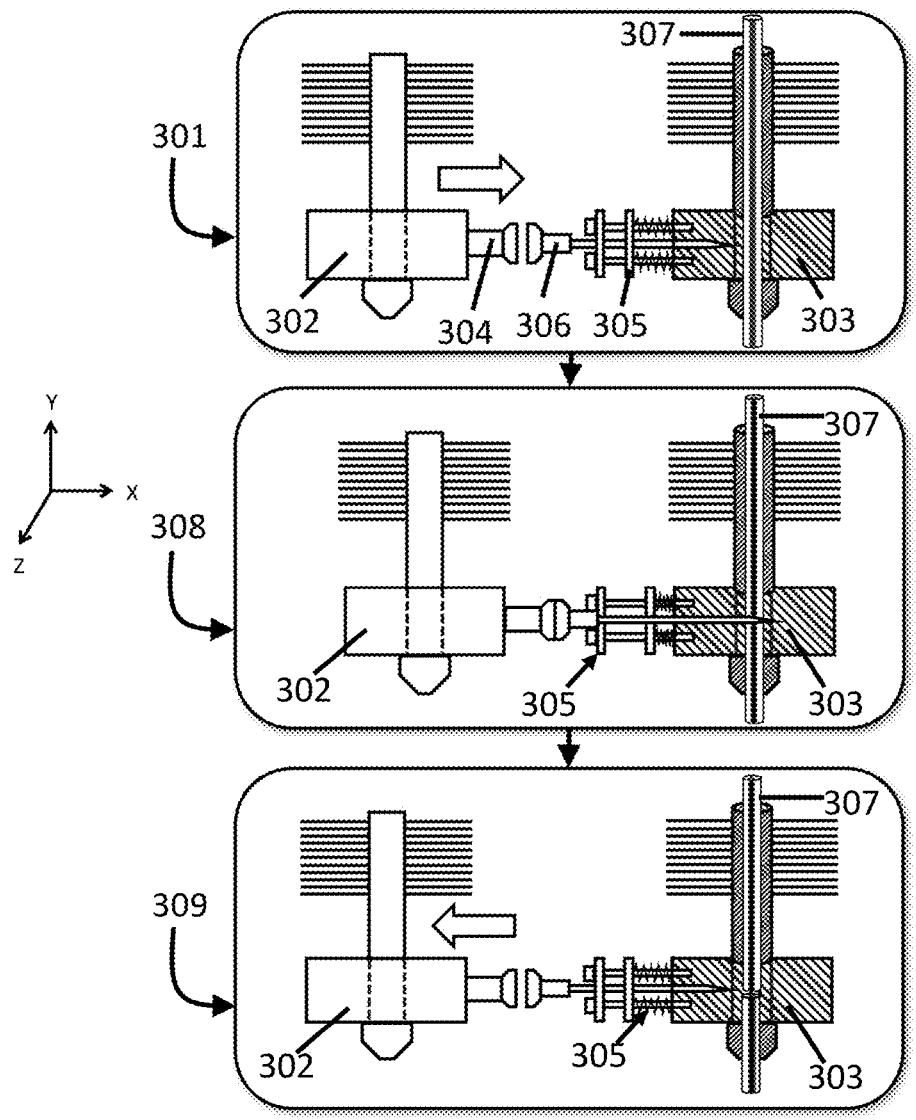
FIG. 3 shows exemplary motion of one 3D printing toolhead moving to engage a cutting mechanism on another 3D printing toolhead.

FIG. 3 shows one embodiment of toolhead movements to cut a solid core filament. At 301, two toolheads 302 (e.g., left toolhead, second toolhead) and 303 (e.g., right toolhead, first toolhead) are separated. In this embodiment, the toolhead 302 is a standard toolhead 302, and the toolhead 303 is a continuous wire filament extruder toolhead 303. In some embodiments, the standard toolhead 302 has a contact plate 304 for creating a force on a cutting mechanism 305 located on the continuous wire toolhead 303. The continuous wire toolhead 303 has a continuous wire 3D printing filament 307 that is to be cut before moving the toolhead. To initiate a cut sequence, the second toolhead 302 moves towards the continuous wire toolhead 303 (see the arrow at 301). At 308, the second toolhead 302 comes into contact with the cutting mechanism 305 on the continuous wire toolhead 303, and the applied force moves at least part of the cutting mechanism 305 (e.g., a blade and a spring plate) relative to the continuous wire toolhead 303 and the continuous wire 3D printing filament 307. At 309, the continuous wire 3D printing filament 307 has been cut, and the second toolhead 302 moves away from the continuous wire filament toolhead 303 (see the arrow at 309), releasing the cutting mechanism 305. At least part of the cutting mechanism 305 (e.g., the blade) moves back to a rest position (e.g., due to being spring loaded).

Figure 4:
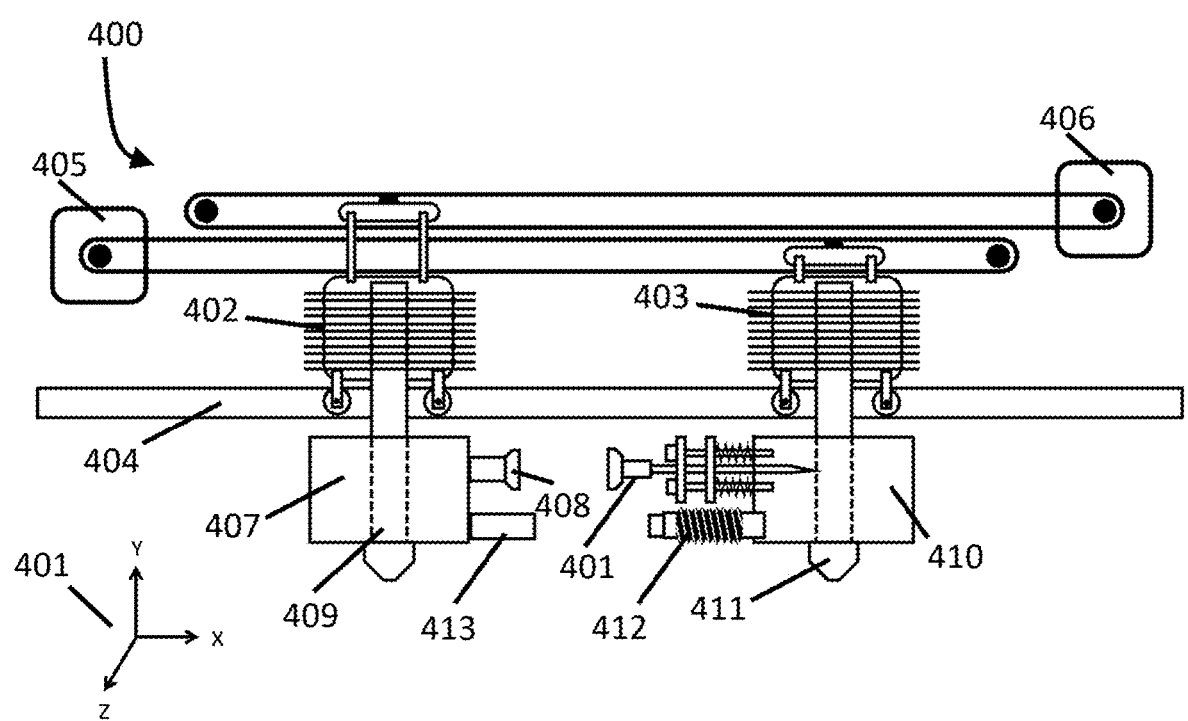
FIG. 4 shows one embodiment of a dual extrusion 3D printer system with a cutting mechanism that includes a proximity sensor for collision detection.

FIG. 4 shows one embodiment of a dual independent extruder FFF 3D printing system 400 (e.g., an FFF 3D printing system) that includes a filament cutting mechanism 401. In other embodiments, the filament cutting mechanism 401 is installed on other types of printing systems. The FFF 3D printing system 400 has three degrees of freedom that coincide with the cartesian coordinate system C, with X, Y, and Z directions. A print surface is located in the XY plane.

The FFF 3D printing system 400 includes two filament extruder heads 402 (e.g., left toolhead in FIG. 4) and 403 (e.g., right toolhead in FIG. 4). The two filament extruder heads 402 and 403 are attached to a same linear rail 404 that keeps the same Y and Z position but allows independent movement in the X direction. The X direction movement is controlled by independent stepper motors 405 and 406 for the two filament extruder heads 403 and 402, respectively. The left toolhead 402 includes a standard FFF heater block 407. The heater block 407 of the left toolhead 402 has an attachment 408 (e.g., a rigid mass or body) configured to apply a force against the right extruder head 403. The attachment 408 extends away from an outer surface of the heater block 407 (e.g., towards a heater block 410 of the right toolhead 403). The left toolhead 402 prints standard FFF filament through a standard FFF nozzle 409. The right toolhead 403 has a modified system for printing solid core filament including a specialized heater block 410 and printing nozzle 411.

The filament cutting mechanism 401 is mounted to the heater block 410 of the right toolhead 403 and has a contact surface configured to interface with the contact surface 408 of the left toolhead 402. When the right toolhead 403 has finished printing a segment and stopped movement, the left toolhead 402 may travel along the linear rail 404 in the positive X direction and push against the cutting mechanism 401 (e.g., the contact surface of the filament cutting mechanism 401). After the cut is complete, the left toolhead 402 moves in the negative X direction away from the right toolhead 403. After the solid wire filament has been cut in the heater block 410, the right toolhead 403 is free to move without dragging the solid wire filament.

In the embodiment shown in FIG. 4, the FFF 3D printing system 400 also includes a proximity probe. In the embodiment shown in FIG. 4, the proximity probe includes, for example, a proximity sensor 412 on the right toolhead 403 and a piece of metal 413 or another proximity sensor on the left toolhead 402. For example, the proximity sensor 412 interacts with the piece of metal 413 to determine a distance between the left toolhead 402 and the right toolhead 403. In another embodiment, the left toolhead 402 includes the proximity sensor, and the right toolhead 403 includes, for example, the piece of metal 413.

The proximity probe 412 is used to determine when the two toolheads 402 and 403 are at an appropriate distance apart for the cutting mechanism to stop (e.g., a predetermined distance to provide a predetermined cut) and the left toolhead 402 may then stop and reverse in the other direction. In other embodiments, the proximity probe includes, alternatively or in addition, one or more mechanical switches that are flipped when a predetermined distance between the left toolhead 402 and the right toolhead 403 is reached.

In one embodiment, the cutting mechanism 401 does not include a contact surface disposed beyond the proximity probe 412. Instead, the heater block 410 of the right toolhead 403 may support a motor in communication with the cutting mechanism 401. For example, the motor may be operably connected to the cutting mechanism 401, such that the motor is configured to move the cutting mechanism 401 to cut the solid wire filament. The motor may actuate the cutting mechanism 401 based on data received (e.g., by a processor) from the proximity probe 412 or one or more mechanical switches. For example, the motor may actuate the cutting mechanism 401 when a predetermined distance between the left toolhead 402 and the right toolhead 403 is reached.

Figure 5:
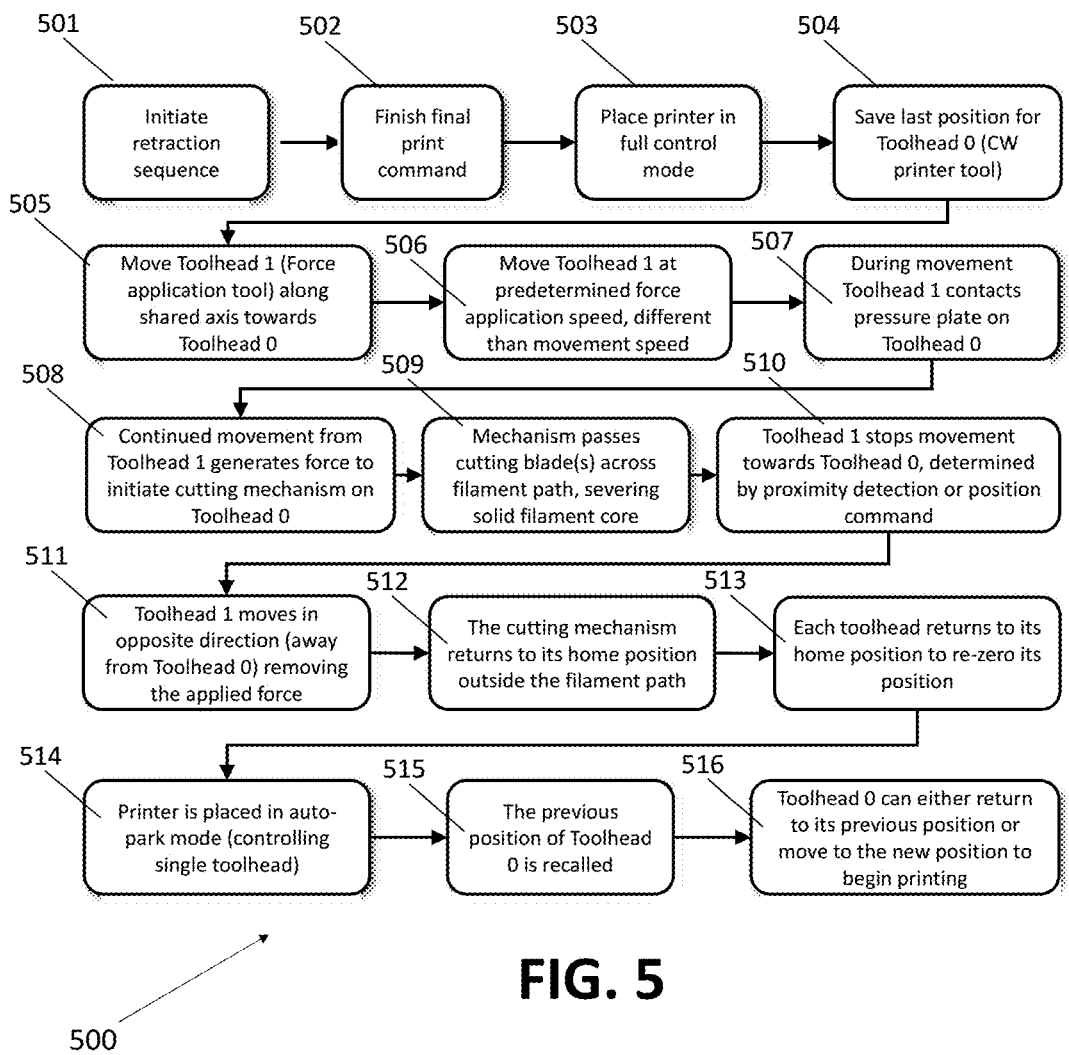
FIG. 5 is a flowchart of a first embodiment of a method for cutting a filament.

FIG. 5 is a flowchart of one embodiment of a control process 500 for a 3D printer to cut a solid wire filament (e.g., a 3D printing filament; filament). The method may be performed using the FFF 3D printing system 400 shown in FIG. 4 or another additive manufacturing system. The method is implemented in the order shown, but other orders may be used. Additional, different, or fewer acts may be provided.

The process 500 begins when a retraction sequence is initiated 501. A retraction is a standard FFF 3D printing action where the 3D printing filament is drawn backwards, and a print nozzle is moved away from a printing bed, so that a toolhead (e.g., a first toolhead) stops printing and moves to a new spot on a part to resume printing. After the retraction command is initiated at act 501, a print command finishes 502. At this time, an extruder gear stops pushing out the filament and three position motors, for example, stop moving the first toolhead. Once the first toolhead (or the first toolhead and a second toolhead) is no longer moving, in act 503, a processor (e.g., of the 3D printer or outside the 3D printer) sends a command to put the 3D printer in full control mode. This allows two or more toolheads to be moved independently without forcing non-moving toolheads to park in corresponding home positions.

In act 504, the processor saves a position of the first toolhead (e.g., toolhead 0; a printing toolhead) in a memory of the 3D printer. This may be performed during pre-processing of the software prior to printing or during the print process by saving the position of the first toolhead to on board memory of the 3D printer. In act 505, the second toolhead (e.g., an auxiliary toolhead providing the force application; Toolhead 1) is moved along a shared axis (e.g., the cartesian X axis) towards Toolhead 0 (e.g., in a first direction). In act 506, the processor sets a speed for Toolhead 1 movement to be different than a common movement speed. The speed is a specific speed configured to provide reliable actuation of a cutting mechanism on the Toolhead 0 (e.g., 20 mm/s).

In act 507, while Toolhead 1 is moving, Toolhead 1 comes into contact with a pressure plate on Toolhead 0. In act 508, continued movement by Toolhead 1 in the first direction applies a force on the pressure plate on Toolhead 0, which, in act 508, begins movement of at least part of the cutting mechanism relative to the 3D printing filament to be cut. The movement of the cutting mechanism causes one or more blades to come in contact with the 3D printing filament within an extruder of Toolhead 0. In act 509, a sufficient force is applied to the cutting mechanism to sever, for example, a solid wire of copper at least 0.7 mm in diameter or a tow of carbon fibers with a diameter of at least 0.7 mm. For example, the processor controls the speed of Toolhead 1 towards Toolhead 0, such that a sufficient force is applied, by Toolhead 1 or an attachment to Toolhead 1, to the cutting mechanism to sever the 3D printing filament.

In act 510, either through a move of predetermined distance or triggering of a proximity flag (e.g., a spike in current from Toolhead 1 stepper motor), the movement of Toolhead 1 is stopped (e.g., via a command by the processor). In act 511, Toolhead 1 then moves in a second direction (e.g., opposite the first direction; away from Toolhead 0), thereby removing the applied force to the cutting mechanism. In act 512, the cutting mechanism returns to a resting position through a spring force; this removes the blade from the filament path in the 3D printing extruder.

After the collision of the toolheads (e.g., the attachment on Toolhead 1 and the cutting mechanism on Toolhead 0), an exact position of each toolhead may not be known precisely. In act 513, Toolhead 0 and Toolhead 1 are commanded to return to home positions, respectively, to re-zero coordinates that coincide with the cutting mechanism (e.g., the X coordinate). In act 514, the processor places the 3D printer back in a standard mode (e.g., Auto Park), where a single toolhead is controlled at any given time. In act 515, the position of Toolhead 0 is recalled either within the gcode or from the printer memory 515, and in act 516, Toolhead 0 is commanded to either return to a last position or is moved to a next location to begin printing.

Figure 6:
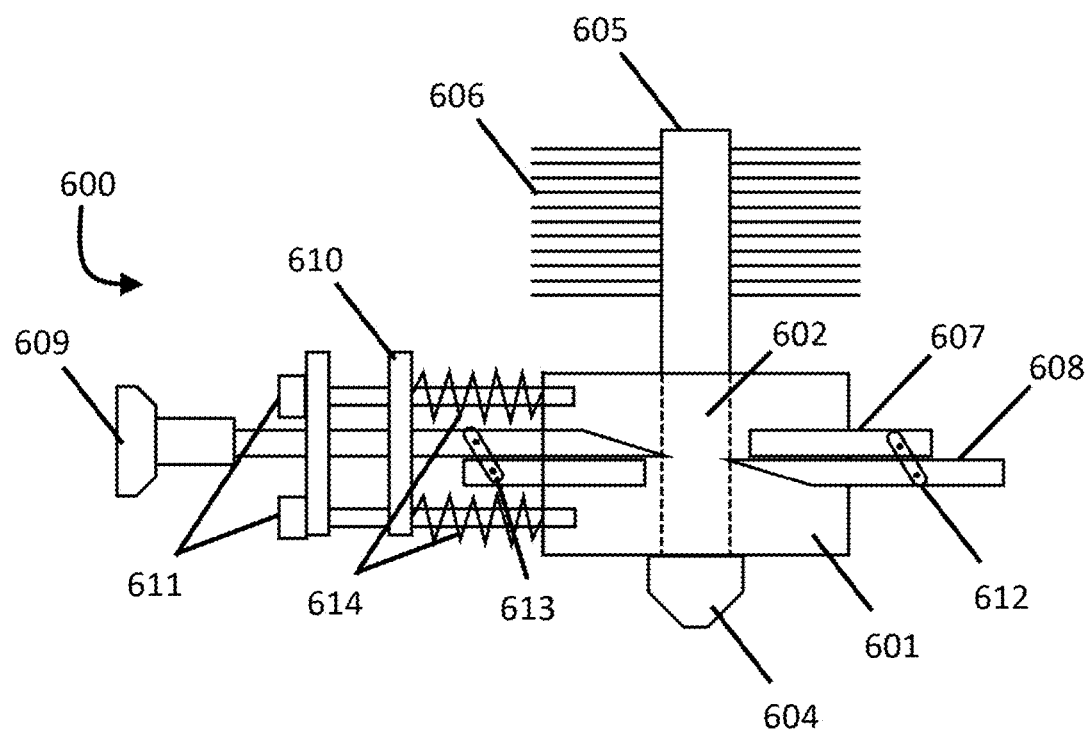
FIG. 6 shows an embodiment of a motion-actuated cutting mechanism with opposing blades.

FIG. 6 shows one embodiment of a cutting mechanism 600 attached to a hot end of a 3D printing filament extrusion system. A metal block 601 of the 3D printing filament extrusion system is heated to melt a filament 602 passing through a hole. The filament 602 enters the heating zone from a cylinder 605 connected above the heating zone. The cylinder 605 includes a heat sink 606 to provide that the polymer is not melted before entering the metal block 601 (e.g., a hot end). The polymer contained within a volume of the cylinder 605 will be molten during 3D printing, but a solid wire core remains and extends through the middle of the cylinder 602 in an axial direction.

Two opposing blades 607 and 608 are positioned such that when the two opposing blades 607 and 608 move towards each other, the motion cuts through the solid wire. A solid strike surface 609 is mounted to an end of a blade 607 of the two opposing blades. A force from outside the cutting mechanism 600 may be applied to the solid strike surface 609 mounted to the blade 607. For example, the force applied to the solid strike surface 609 may be from motion of an independent toolhead. A force applied to the solid strike surface 609 moves the blade 607 and a spring plate 610 that is guided and attached to the metal block 601 with mounting screws 611. One or more linkages (e.g., two linkages 612 and 613) create opposing motion for the blade 608, such that there is a sheering between the two opposing blades 607 and 608. The sheering cuts the solid wire in the filament 602.

Compression springs 614 on the mounting screws 611 push the blade 607 back to a resting position once the force has been removed from the strike surface 609. The cutting mechanism 600 may also include a stop plate, such that the compression springs 614 do not push the spring plate 610 off the mounting screws 611, and thus the blade 607 off the cutting mechanism 600. In one embodiment, the blade 607 moves with the spring plate 610, but the blade 607, and thus the spring plate 610, are movable relative to the mounting screws 611 and the stop plate.

Figure 7:
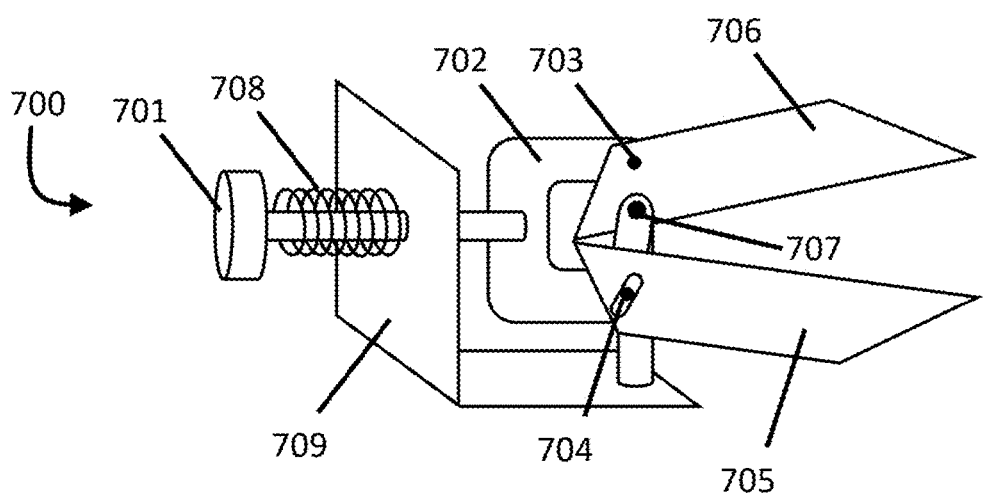
FIG. 7 shows an embodiment of a motion-actuated cutting with a scissor cutting mechanism.

FIG. 7 shows one embodiment of a cutting mechanism 700 that may be activated through linear motion of a toolhead. The cutting mechanism is, for example, a scissor mechanism that relies on an applied force on a pressure plate 701. The pressure plate 701 pushes a plate 702. The plate 702 has two attached pins 703 and 704. Scissor blades 705 and 706 are moved by the two pins 703 and 704, but a third stationary pin 707 forces the blade 706 to rotate around the third stationary pin 707, causing a scissor cutting motion. A spring 708 presses against a stationary plate 709 and returns the cutting mechanism 700 to an initial position when the force is removed. The stationary plate 709 also holds the pin third stationary pin 707 in position.

Figure 8:
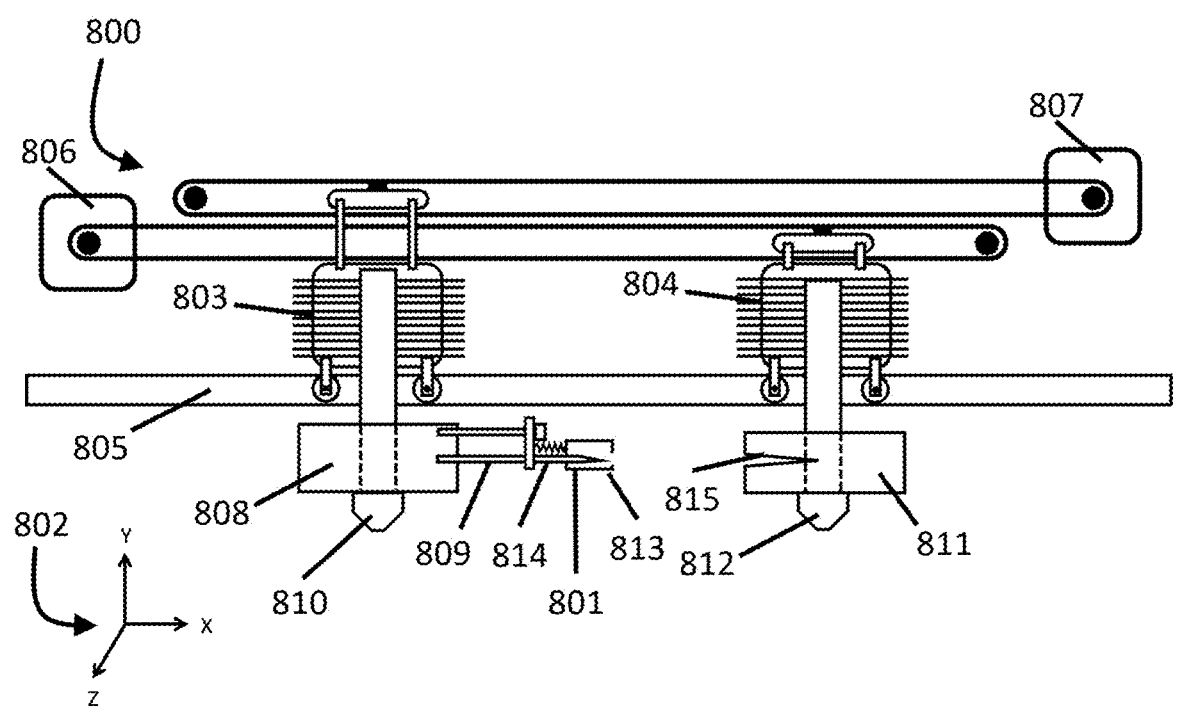
FIG. 8 shows an embodiment of a dual extrusion 3D printer system with a cutting mechanism.

FIG. 8 shows one embodiment of a dual independent extruder FFF 3D printing system 800 that includes a filament cutting mechanism 801. This FFF 3D printing system 800 has three degrees of freedom that coincide with the cartesian coordinate system 802 with X, Y, and Z directions. A print surface is located in the XY plane. The dual independent extruder FFF 3D printing system 800 includes two filament extruder heads 803 (e.g., a left toolhead) and 804 (e.g., a right toolhead). The two filament extruder heads 803 and 804 are attached to a same linear rail 805 that keeps the same Y and Z position but allows independent movement in the X direction. The X direction movement is controlled by independent stepper motors 806 and 807 for the two filament extruder heads 803 and 804, respectively. The left toolhead 803 includes a standard FFF heater block 808 and an attachment 809 configured to apply force against the right toolhead 804.

The left toolhead 803 prints standard FFF filament through a standard FFF nozzle 810. The right toolhead 804 has a modified system for printing solid core filament. The modified system of the right toolhead 804 includes a specialized heater block 811 and a printing nozzle 812. When the right toolhead 804 has finished printing a segment and stops moving, the left toolhead 803 may travel along the linear rail 805 in the positive X direction, such that the right toolhead 804 pushes against the cutting mechanism 801. After the cut is complete, the left toolhead 803 moves in the negative X direction away from the right toolhead 802. After the solid wire filament has been cut in the heater block 811, the right toolhead 804 is free to move without dragging the solid wire filament.

In the embodiment shown in FIG. 8, the filament cutting mechanism 801 is mounted to the heater block 808 of the left toolhead 803 and has a contact surface 813 configured to press against the right heater block 811. The contact surface 813 also functions as a cover for a cutting blade 814. When a force is applied, the blade 814 is exposed through an opening in the contact surface 813. The heater block 811 of the right toolhead 804 includes a small opening 815 that is angled to more easily accept the incoming cutting blade 814 and guide the cutting blade 814 to a narrow cutting location within the heater block 811.

Figure 9:
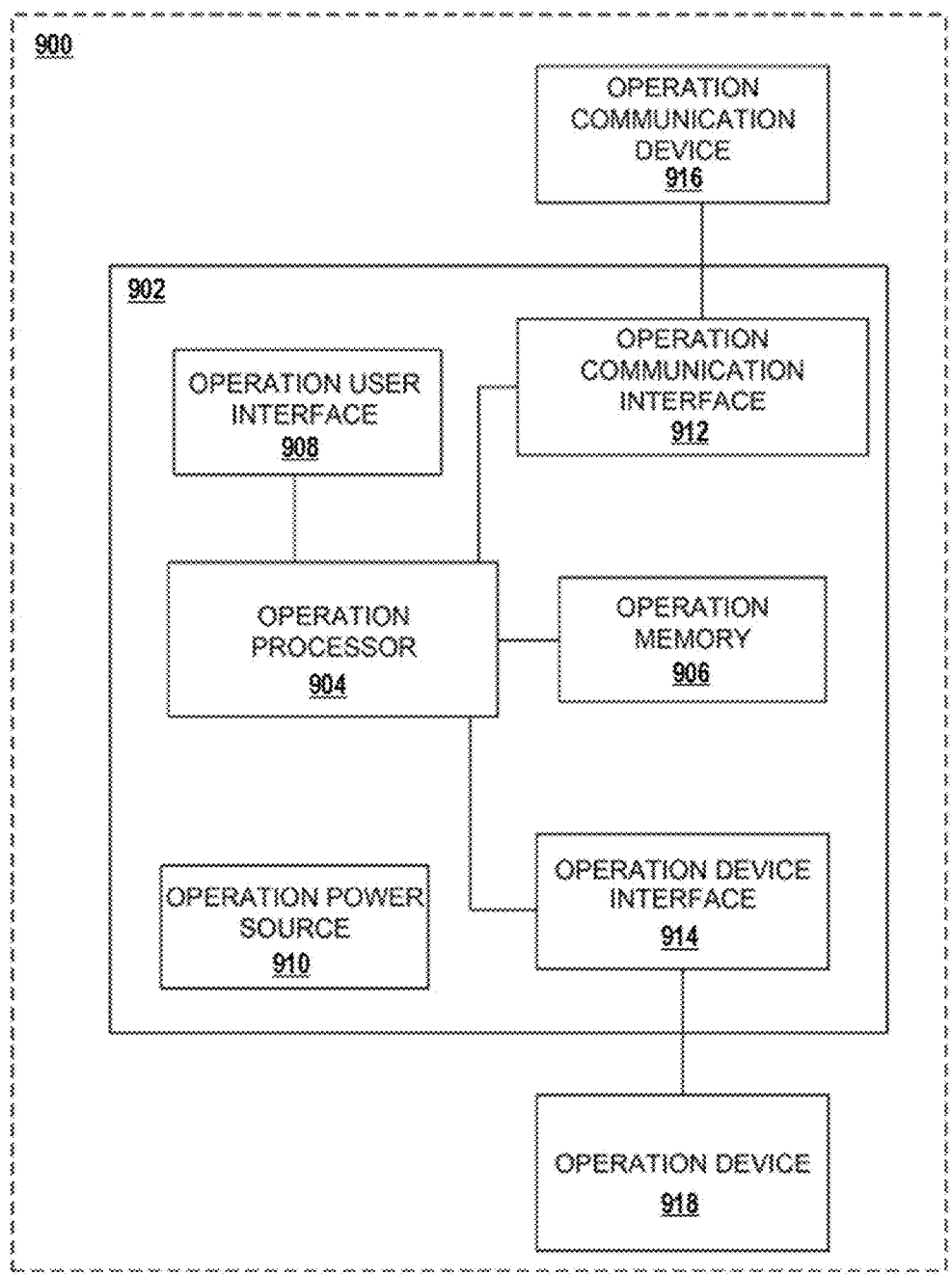
FIG. 9 is a block diagram of an operation component.

FIG. 9 is a block diagram of an operation component 900. The operation component 900 (e.g., a controller) may be part of one or more of the previously described components or systems such as, for example, the 3D printing system 200 and/or the FFF 3D printing system 400. A plurality of operation components 900 may be provided. For example, the 3D printing system 200 may include two operation components 900 to control the filament extruder heads 202 and 203, respectively. The operation component 900 may be configured to implement one or more of the methods or functionality as described herein.

The operation component 900 is provided with an operation unit 902, which may be a circuit board or an alternative configuration. The operation unit 902 includes an operation processor 904, an operation memory 906, an operation user interface 908, an operation power source 910, an operation communication interface 912, and an operation device interface 914. In an embodiment, the operation communication interface 912 is in communication with an operation communication device 916, and the operation device interface 914 is in communication with an operation device 918. Additional, different, or fewer components may be provided. For example, the operation user interface 908 may be omitted.

The operation processor 904 may include a general processor, digital signal processor, an ASIC, FPGA, analog circuit, digital circuit, combinations thereof, or other now known or later developed processor. The operation processor 904 may be a single device or combinations of devices, such as through shared or parallel processing.

The operation memory 906 may be a volatile memory or a non-volatile memory. The operation memory 906 may include one or more of a ROM, a RAM, a flash memory, an EEPROM, or other type of memory. The operation memory 906 may be removable from the operation component 900, such as an SD memory card. In a particular non-limiting, exemplary embodiment, a computer-readable medium may include a solid-state memory such as a memory card or other package that houses one or more non-volatile read-only memories. Further, the computer-readable medium may be a random access memory or other volatile re-writable memory. Additionally, the computer-readable medium may include a magneto-optical or optical medium, such as a disk or tapes or other storage device. Accordingly, the disclosure is considered to include any one or more of a computer-readable medium and other equivalents and successor media, in which data or instructions may be stored.

The operation memory 906 is a non-transitory computer-readable medium and is described to be a single medium. However, the term "computer-readable medium" includes a single medium or multiple media, such as a centralized or distributed memory structure, and/or associated caches that are operable to store one or more sets of instructions and other data. The term "computer-readable medium" shall also include any medium that is capable of storing, encoding or carrying a set of instructions for execution by a processor or that cause a computer system to perform any one or more of the methods or operations disclosed herein.

The operation power source 910 is a portable power source that may be stored internal to the operation component 900 or stored external to the operation component 900 and communicated to the operation component 900 through a power conductive cable. The operation power source 910 may involve the generation of electric power (e.g., using a mechanical power generator, a fuel cell device, photovoltaic cells, piezoelectric, or other power-generating devices). The operation power source 910 may include a battery such as a device consisting of two or more electrochemical cells that convert stored chemical energy into electrical energy. The operation power source 910 may include a combination of multiple batteries or other power providing devices. Specially fitted or configured battery types, or standard battery types may be used.

The operation device interface 914 provides for operation of a component of the 3D printing system 200, for example. For example, the operation device interface 914 may transmit power from the operation power source 910 to generate movement in the operation device 918 (e.g., a stepper motor 205 or 206). In various embodiments, the operation device interface 914 sends power to control movement of the stepper motor 205, the stepper motor 206, or a combination thereof. The operation device interface 914 includes wired conductive signals and/or data communication circuitry operable to control the operation device 918.

The operation user interface 908 may be one or more buttons, keypad, keyboard, mouse, stylus pen, trackball, rocker switch, touch pad, voice recognition circuit, or other device or component for communicating data between a user and the operation component 900. The operation user interface 908 may be a touch screen, which may be capacitive or resistive. The operation user interface 908 may include an LCD panel, LED, LED screen, TFT screen, or another type of display. The operation user interface 908 may also include audio capabilities or speakers.

The operation communication interface 912 is configured to receive, with the operation communication device 916, data such as measurement data (e.g., proximity data), anticipation signals, operation signals, and/or other signals from components (e.g., a proximity sensor). In one embodiment, the operation component 900 includes more than one operation communication interface 912 in communication with more than one operation communication device 916, respectively. The operation communication interface 912 may also be configured to send data such as status signals (e.g., proximity sensor signals) for reception by, for example, another processor (e.g., outside the 3D printing system 200). The operation communication interface 912 communicates the data using any operable connection. An operable connection may be one in which signals, physical communications, and/or logical communications may be sent and/or received. An operable connection may include a physical interface, an electrical interface, and/or a data interface. One or more operation communication interfaces may provide for wireless communications through the operation communication device 916 in any now known or later developed format. Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

In accordance with various embodiments of the present disclosure, methods described herein may be implemented with software programs executable by a computer system and/or other components of the 3D printing system and/or carried by a user (e.g., a mobile device). Further, in an exemplary, non-limited embodiment, implementations may include distributed processing, component/object distributed processing, and parallel processing. Alternatively, virtual computer system processing may be constructed to implement one or more of the methods or functionality as described herein.

A computer program (also known as a program, software, software application, script, or code) may be written in any form of programming language, including compiled or interpreted languages, and the computer program may be deployed in any form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and the apparatus may also be implemented as, special purpose logic circuitry (e.g., an FPGA or an ASIC).

Processors suitable for the execution of a computer program include, by way of example, both general and special purpose microprocessors, and any one or more processors of any kind of digital computer. Generally, a processor receives instructions and data from a read only memory or a random access memory or both. The essential elements of a computer are a processor for performing instructions and one or more memory devices for storing instructions and data. Generally, a computer also includes, or is operatively coupled to receive data from or transfer data to, or both, one or more mass storage devices for storing data (e.g., magnetic, magneto optical disks, or optical disks). However, a computer need not have such devices. Moreover, a computer may be embedded in another device such as, for example, a mobile telephone, a personal digital assistant ("PDA"), a mobile audio player, a Global Positioning System ("GPS") receiver, a control unit, to name just a few. Computer readable media suitable for storing computer program instructions and data include all forms of non-volatile memory, media and memory devices, including by way of example semiconductor memory devices (e.g., EPROM, EEPROM, and flash memory devices); magnetic disks (e.g., internal hard disks or removable disks); magneto optical disks; and CD-ROM and DVD-ROM disks. The processor and the memory may be supplemented by, or incorporated in, special purpose logic circuitry.

The operation communication device 916 provides for data and/or signal communication from the operation component 900 to another component of the 3D printing system 200, for example, or an external device such as a mobile phone or other computing device. The operation communication device communicates the data using any operable connection. An operable connection may be one in which signals, physical communications, and/or logical communications may be sent and/or received. An operable connection may include a physical interface, an electrical interface, and/or a data interface. The control communication device may be configured to communicate wirelessly, and as such include one or more antennae. The control communication device provides for wireless communications in any now known or later developed format.

A control antenna may also be provided. The control antenna may be a plurality of control antennae. The operation component 900 may include an antenna with circuitry of a PCB of the operation component 900; however, additional antennae may also be included in the circuitry. The control antenna may be integrated with another component of the 3D printing system 200 or may be an independent component.

Figure 10:
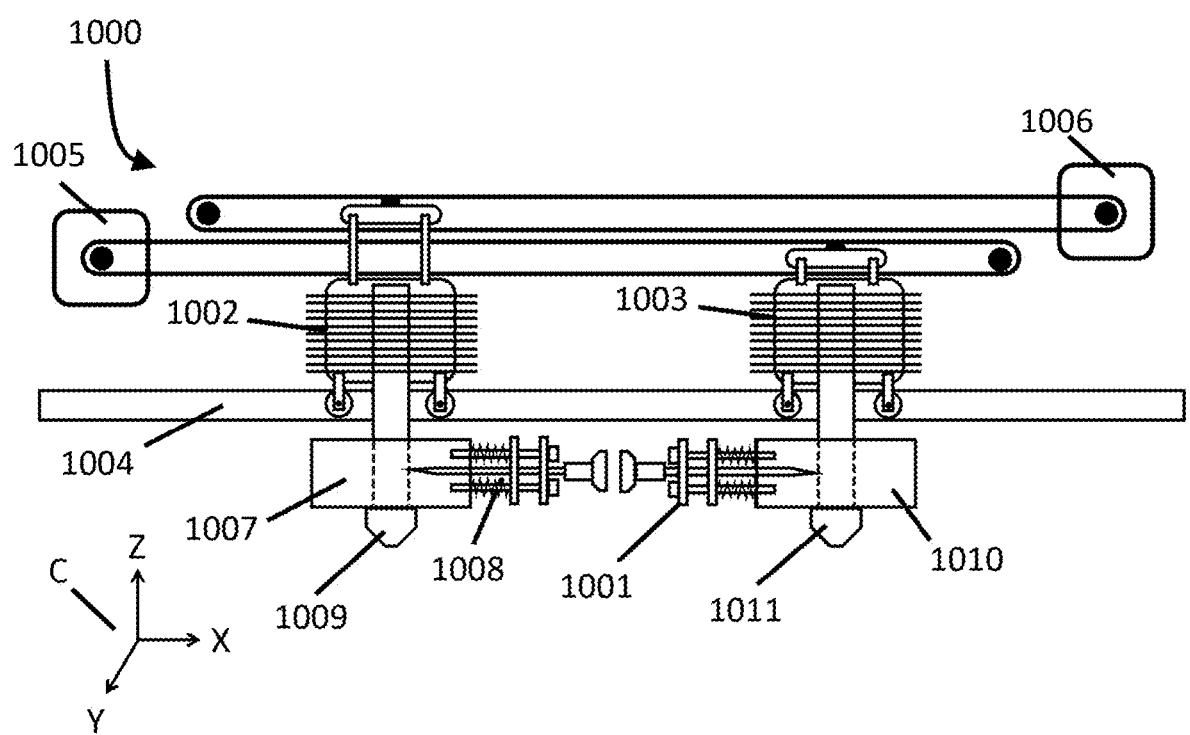
FIG. 10 shows an embodiment of a dual independent extruder FFF 3D printing system.

FIG. 10 shows one embodiment of a dual independent extruder FFF 3D printing system 1000 (e.g., FFF 3D printing system) that includes two filament cutting mechanisms 1001 and 1008. The FFF 3D printing system 1000 has three degrees of freedom that coincide with, for example, the cartesian coordinate system C with X, Y, and Z directions. A print surface is located in, for example, the XY plane. The FFF 3D printing system 1000 includes two filament extruder heads 1002 and 1003. The two filament extruder heads 1002 and 1003 are attached to a same linear rail 1004 that keeps a same Y and Z position but allows independent movement in the X direction. The X direction movement for the two filament extruder heads 1002 (e.g., left toolhead in FIG. 10) and 1003 (e.g., right toolhead in FIG. 10) is controlled by independent stepper motors 1006 and 1005, respectively. The left toolhead 1002 includes a standard FFF heater block 1007 that has an attachment 1008 to apply force against the right toolhead 1003.

The right toolhead 1003 has a modified system for printing solid core filament including a specialized heater block 1010 and a printing nozzle 1011. The left toolhead 1002 also has a modified system for printing solid core filament including a specialized heater block 1007 and a printing nozzle 1009. The right filament cutting mechanism 1001 is mounted to the heater block 1010 and has a contact surface configured to interface with a contact surface of the cutting mechanism 1008 of the left toolhead 1002. When the right toolhead 1003 has finished printing a segment and stopped movement, the left toolhead 1002 may travel along the linear rail 1004 (e.g., by the stepper motor 1005 controlled by a processor) in the positive X direction, such that the contact surface of the left cutting mechanism 1008 pushes against the right cutting mechanism 1001 (e.g., a solid strike surface of the cutting mechanism 1001). After the cut is complete, the left toolhead 1002 moves in a negative X direction away from the right toolhead 1003. The solid wire filament has been cut in the heater block 1010, and the right toolhead 1003 is free to move without dragging the solid wire filament.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations and/or acts are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that any described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, are apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

The invention claimed is:

1. A 3D printer comprising:
 a first extruder head comprising:
  a first heater block; and
  a cutting mechanism attached to the first heater block and configured to cut a filament that is extendable through the first heater block, wherein the cutting mechanism comprises a blade that is movable relative to the first heater block, the blade having a cutting end and a drive end opposite the cutting end, wherein the drive end of the blade has a surface configured to receive a force from outside of the first extruder head, such that the blade moves relative to the first heater block;
 a second extruder head that is movable relative to the first extruder head in a first direction and a second direction, the second direction being opposite the first direction, the second extruder head comprising:
  a second heater block; and
  a force applicator attached to the second heater block; and
 a proximity probe configured to determine a distance between the first heater block and the second heater block
 wherein the second extruder head is configured to move in the first direction and into contact with the first extruder head, such that the force applicator of the second extruder head applies a force to the surface of the drive end of the blade and the blade moves relative to the first heater block and cuts the filament.

2. The 3D printer of claim 1, wherein the force applicator is positionally fixed relative to the second heater block.

3. The 3D printer of claim 1, wherein the blade is a spring-loaded blade.

4. The 3D printer of claim 3, wherein the cutting mechanism further comprises a support that is attached to the first heater block, the support supporting the blade, such that the blade is translatable relative to the support and the first heater block.

5. The 3D printer of claim 4, wherein the blade is configured to translate between a first position relative to the first heater block and a second position relative to the first heater block,
 wherein the first position is a rest position in which no force from outside of the first extruder head is applied to the surface of the drive end of the blade, and wherein the second position is a cutting position in which the blade is configured to cut the filament.

6. The 3D printer of claim 5, wherein the second extruder head is configured to move in the second direction, away from the first extruder head and out of contact with the first extruder head, and the spring-loaded blade is configured to return to the rest position when the second extruder head is out of contact with the first extruder head.

7. The 3D printer of claim 5, wherein a portion of the blade is disposed within the first heater block when the blade is in the rest position.

8. The 3D printer of claim 1, wherein the cutting mechanism is a first cutting mechanism, the filament is a first filament, the blade is a first blade, and the surface is a first surface,
   wherein the second extruder head further comprises a second cutting mechanism configured to cut a second filament that is extendable through the second heater block, the second cutting mechanism comprising:
       a second blade that is movable relative to the second heater block, the second blade having a cutting end and a drive end opposite the cutting end of the second blade, the drive end of the second blade having a second surface configured to receive a force from outside of the second extruder head, such that the second blade moves relative to the second heater block, and
   wherein the force applicator comprises the second surface of the drive end of the second blade.

9. The 3D printer of claim 1, wherein the proximity probe comprises:
   a proximity sensor attached to one of the first heater block and the second heater block, and a metal target attached to the other of the first heater block and the second heater block.

10. A 3D printer comprising:
    a first extruder head comprising:
        a first heater block; and
        a first cutting mechanism attached to the first heater block and configured to cut a first filament that is extendable through the first heater block, wherein the first cutting mechanism comprises a first blade that is movable relative to the first heater block, the first blade having a cutting end and a drive end opposite the cutting end, wherein the drive end of the first blade has a first surface configured to receive a force from outside of the first extruder head, such that the first blade moves relative to the first heater block;
    a second extruder head that is movable relative to the first extruder head in a first direction and a second direction, the second direction being opposite the first direction, the second extruder head comprising:
        a second heater block; and
        a force applicator attached to the second heater block, wherein the second extruder head is configured to move in the first direction and into contact with the first extruder head, such that the force applicator of the second extruder head applies a force to the surface of the drive end of the blade and the blade moves relative to the first heater block and cuts the filament; and
        a second cutting mechanism configured to cut a second filament that is extendable through the second heater block, the second cutting mechanism comprising:
            a second blade that is movable relative to the second heater block, the second blade having a cutting end and a drive end opposite the cutting end of the second blade, the drive end of the second blade having a second surface configured to receive a force from outside of the second extruder head, such that the second blade moves relative to the second heater block,
    wherein the force applicator comprises the second surface of the drive end of the second blade.

* * * * *